United States Patent
Li et al.

(10) Patent No.: US 8,611,912 B2
(45) Date of Patent: Dec. 17, 2013

(54) BANDWIDTH CONFIGURATION METHOD, DEVICE, AND SYSTEM

(75) Inventors: Tingzhao Li, Shanghai (CN); Jieke Shi, Shanghai (CN); Gengshi Wu, Shanghai (CN); Xiaoxiao Zheng, Shanghai (CN); Bin Xiong, Shanghai (CN); Yi Yang, Shanghai (CN); Jing Yang, Shanghai (CN); Fanni Ma, Shanghai (CN)

(73) Assignee: Huawei Device Co., Ltd., Shenzhen (CN)

( * ) Notice: Subject to any disclaimer, the term of this patent is extended or adjusted under 35 U.S.C. 154(b) by 170 days.

(21) Appl. No.: 13/328,550

(22) Filed: Dec. 16, 2011

(65) Prior Publication Data

US 2012/0157109 A1    Jun. 21, 2012

(30) Foreign Application Priority Data

Dec. 17, 2010 (CN) .......................... 2010 1 0613490

(51) Int. Cl.
*H04W 72/00* (2009.01)
(52) U.S. Cl.
USPC ........... 455/450; 455/266; 455/436; 370/328; 370/338; 370/331
(58) Field of Classification Search
USPC ........... 455/450, 266, 436; 370/328, 338, 331
See application file for complete search history.

(56) References Cited

U.S. PATENT DOCUMENTS

| | | | |
|---|---|---|---|
| 5,914,942 A * | 6/1999 | Hassan et al. | 370/316 |
| 2007/0281635 A1 | 12/2007 | McCallister et al. | |
| 2008/0112361 A1 | 5/2008 | Wu | |
| 2010/0290544 A1 | 11/2010 | Kawamura et al. | |

FOREIGN PATENT DOCUMENTS

| | | |
|---|---|---|
| CN | 101438611 A | 5/2009 |
| EP | 1998586 A1 | 12/2008 |
| JP | 2006067236 A | 3/2006 |

OTHER PUBLICATIONS

Office Action issued in corresponding European Patent Application No. 11194004.5, mailed Feb. 27, 2013.
Office Action issued in corresponding Chinese Patent Application No. 201010613490.4, mailed Dec. 31, 2012.
Extended European Search Report issued in corresponding European Patent Application No. 11194004.5, mailed Apr. 20, 2012.
Marache et al., "Downlink Impact of GSM900 on UMTS900 in Co-Sited Case" IEEE 2008.
$3^{rd}$ Generation Partnership Project, "Technical Specification Group Radio Access Network; UMTS 900 MHz Work Item Technical Report" (Release 8) 3GPP TR 25.816. V8.0.0, Sep. 2009.
Office Action issued in corresponding European Patent Application No. 11194004,5, mailed Jul. 24, 2013, 4 pages.

* cited by examiner

*Primary Examiner* — Nghi H Ly
(74) *Attorney, Agent, or Firm* — Brinks Gilson & Lione

(57) ABSTRACT

A bandwidth configuration method includes: A terminal acquires that a narrow bandwidth mode is used at a network side by a downlink transmission signal and/or an uplink transmission signal; and the terminal configures a receiving bandwidth and/or a transmitting bandwidth, where the receiving bandwidth and/or the transmitting bandwidth corresponds to the narrow bandwidth mode at the network side. The terminal side can acquire whether the network side uses the narrow bandwidth technology, and automatically adjust a bandwidth of a corresponding channel at the terminal side when the network side uses the narrow bandwidth technology, so that intra-system performance loss and inter-system interference that are caused by different bandwidth modes between the terminal side and the network side are avoided, thus improving performance of a communication system.

11 Claims, 5 Drawing Sheets

BANDWIDTH CONFIGURATION METHOD, DEVICE, AND SYSTEM

CROSS-REFERENCE TO RELATED APPLICATIONS

This application claims priority to Chinese Patent Application No. 201010613490.4, filed on Dec. 17, 2010, which is hereby incorporated by reference in its entirety.

FIELD OF THE INVENTION

The present invention relates to the field of mobile communications technologies, and in particular, to a bandwidth configuration method, device, and system.

BACKGROUND OF THE INVENTION

A wireless air interface of a UMTS (Universal Mobile Telecommunications System, universal mobile telecommunications system) uses a WCDMA (Wideband Code Division Multiple Access, wideband code division multiple access) technology.

Currently, it is allowed in many countries to deploy WCDMA at a main frequency band 900 MHz of a GSM (Global System for Mobile Communications, global system for mobile communications), to introduce the WCDMA into a new region by using a few base station sites, so as to bring a better coverage effect. Coordinative deployment is a specific implementation mode of deploying the WCDMA and the GSM at a same frequency band. The coordinative deployment means that the WCDMA and the GSM share a same site, and are deployed by a same operator. A carrier interval between the WCDMA and the GSM is compressed into be smaller than 2.8 MHz. Although the coordinative deployment saves spectrum resources, because the carrier interval between the WCDMA and the GSM is small, inter-system interference is large, which causes network communication performance to deteriorate. To solve the problem, a narrow bandwidth technology applied at a network side is proposed.

The narrow bandwidth technology aims at reducing a passband bandwidth and/or increase a transition band suppression characteristic. By using the narrow bandwidth technology at the network side, a bandwidth occupied by a transmission signal is reduced, so that in the coordinative deployment, the inter-system interference is reduced. By taking an example that the narrow bandwidth technology is used by a communication device supporting a WCDMA network, filtering waveforms of a filter of the communication device are as shown in FIG. 1, where a waveform 1 is a bandwidth waveform specified in an existing communication standard; a waveform 2 is a bandwidth waveform in a first narrow bandwidth mode, and in the first narrow bandwidth mode, the passband bandwidth is the same as the passband bandwidth specified in the existing communication standard, but the transition band suppression characteristic is increased; and a waveform 3 is a bandwidth waveform in a second narrow bandwidth mode, and in the second narrow bandwidth mode, the passband bandwidth is reduced, and the transition band suppression characteristic is increased. In the narrow bandwidth mode, the width of the passband bandwidth and a value of a transition band suppression characteristic parameter may be specifically set by an operator according to actual demands. As an example instead of a limitation, as shown in FIG. 2, during the coordinative deployment of the WCDMA and the GSM, if the communication device of the WCDMA network uses the narrow bandwidth technology, a 4.2 MHz narrow bandwidth is supported in a 5 MHz WCDMA frequency band, and a 0.8 MHz bandwidth may be saved, which is used by a GSM network; a 3.8 MHz narrow bandwidth is supported in the 5 MHz WCDMA frequency band, and a 1.2 MHz bandwidth may be saved, which is used by the GSM network.

In the process of implementing the present invention, the inventor finds that the prior art at least has the following problems:

In the existing WCDMA communication standard, a terminal side does not support the narrow bandwidth technology. When the network side applies the narrow bandwidth technology, because the terminal side does not support the narrow bandwidth technology, intra-system performance loss is caused by mismatching between a receiving bandwidth and a transmitting bandwidth, and interference between adjacent systems is increased.

SUMMARY OF THE INVENTION

Embodiments of the present invention provide a bandwidth configuration method, device, and system, so as to avoid intra-system performance loss and an increase of inter-system interference due to the fact that a terminal side does not support a narrow bandwidth technology.

The objectives of the present invention is achieved by the following technical solutions:

A bandwidth configuration method includes:
acquiring, by a terminal, that a narrow bandwidth mode is used at a network side by a downlink transmission signal and/or an uplink transmission signal; and
configuring, by the terminal, a receiving bandwidth and/or a transmitting bandwidth, where the receiving bandwidth and/or the transmitting bandwidth corresponds to the narrow bandwidth mode at the network side.

A bandwidth configuration method includes:
receiving, by a terminal, data by using each pre-configured bandwidth mode respectively, where the each bandwidth mode is corresponding to each of multiple bandwidth modes of a downlink transmission signal respectively, where the multiple bandwidth modes of the downlink transmission signal are preset by a network side;
comparing receiving performance of the each bandwidth mode; and
selecting a bandwidth mode with the optimal receiving performance, and configuring a receiving bandwidth according to the selected bandwidth mode.

A bandwidth configuration method includes:
sending, by a network-side device, a narrow bandwidth parameter corresponding to a currently-used narrow bandwidth mode to a terminal, to notify the terminal that a narrow bandwidth mode is used at a network side.

A bandwidth configuration terminal includes:
a message obtaining module, configured to acquire that a narrow bandwidth mode is used at a network side by a downlink transmission signal and/or an uplink transmission signal; and
a bandwidth configuring module, configured to configure a receiving bandwidth and/or a transmitting bandwidth, where the receiving bandwidth and/or the transmitting bandwidth corresponds to the narrow bandwidth mode at the network side.

A bandwidth configuration terminal includes:
a detecting module, configured to receive data by using each pre-configured bandwidth mode respectively, where the each bandwidth mode is corresponding to each of multiple bandwidth modes of a downlink transmission signal respectively, where the multiple bandwidth modes of the downlink transmission signal are preset by a network side; and compare receiving performance of the each bandwidth mode; and a bandwidth configuring module, configured to select a bandwidth mode with the optimal receiving performance, and configure a receiving bandwidth according to the selected bandwidth mode.

A bandwidth configuration system includes:

a network-side device, configured to send a narrow bandwidth parameter corresponding to a currently-used narrow bandwidth mode to a terminal, to notify the terminal that a narrow bandwidth mode is used at a network side; and a terminal, configured to receive the narrow bandwidth parameter sent by the network-side device, and configure, according to the narrow bandwidth parameter, a receiving bandwidth and/or a transmitting bandwidth, where the receiving bandwidth and/or the transmitting bandwidth corresponds to the narrow bandwidth mode at the network side, where the narrow bandwidth parameter includes: a passband bandwidth parameter of a narrow bandwidth mode used by a downlink transmission signal at the network side and/or a transition band suppression characteristic parameter of the narrow bandwidth mode used by the downlink transmission signal at the network side, and/or a passband bandwidth parameter of a narrow bandwidth mode used by an uplink transmission signal at the network side and/or a transition band suppression characteristic parameter of the narrow bandwidth mode used by the uplink transmission signal at the network side.

It can be seen from the technical solutions provided by the embodiments of the present invention that, in the embodiments of the present invention, the terminal side can acquire whether the narrow bandwidth technology is used at the network side, and automatically adjust the corresponding receiving bandwidth and/or transmitting bandwidth at the terminal side when the narrow bandwidth technology is used at the network side, so that intra-system performance loss and inter-system interference that are caused by different bandwidth modes between the terminal side and the network side are avoided, thus improving performance of a communication system.

BRIEF DESCRIPTION OF THE DRAWINGS

To illustrate the technical solutions according to the embodiments of the present invention or in the prior art more clearly, accompanying drawings for describing the embodiments or the prior art are introduced briefly in the following. Apparently, the accompanying drawings in the following description are only some embodiments of the present invention, and persons of ordinary skill in the art may further obtain other drawings from the accompanying drawings without creative efforts.

DETAILED DESCRIPTION OF THE EMBODIMENTS

The technical solutions according to the embodiments of the present invention are clearly and fully described in the following with reference to the accompanying drawings in the embodiments of the present invention. Obviously, the embodiments to be described are only part of rather than all of the embodiments of the present invention. All other embodiments obtained by persons of ordinary skill in the art based on the embodiments of the present invention without creative efforts shall fall within the protection scope of the present invention.

Figure 2:
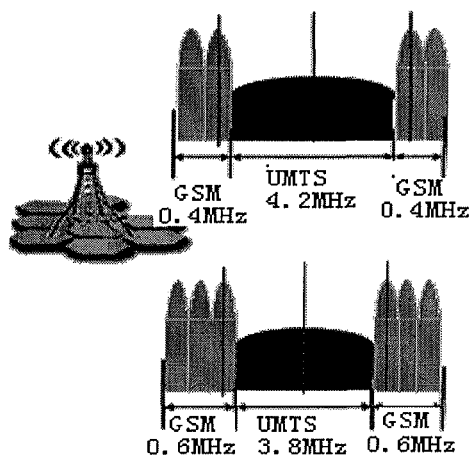
FIG. 2 is a schematic diagram of bandwidth allocation in coordinative deployment in the prior art.
Figure 3:
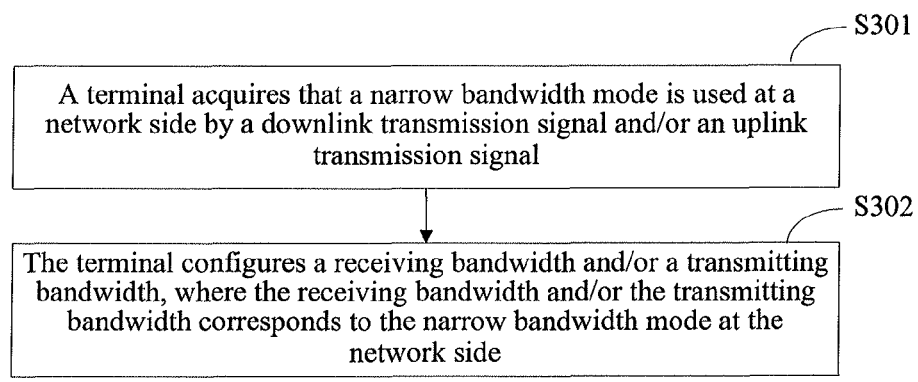
FIG. 3 is a flow chart of a method according to an embodiment of the present invention.

An existing communication device that applies a narrow bandwidth technology is a network-side device. That is, the narrow bandwidth technology is used at the network side. However, communication is still performed according to a receiving bandwidth and a transmitting bandwidth that are specified in an existing communication standard at a terminal side. When the network side applies the narrow bandwidth, because the terminal side and the network side have different downlink bandwidths and/or uplink bandwidths, intra-system performance loss is caused by mismatching between the receiving bandwidth and the transmitting bandwidth, and interference between adjacent systems is increased. By taking an example that a UMTS network supports the narrow bandwidth technology as shown in FIG. 2, in the case that the network side supports a 4.2 MHz narrow bandwidth, for a 16 QAM (a QAM modulation mode including 16 types of symbols; QAM, Quadrature Amplitude Modulation, quadrature amplitude modulation) modulated HSDPA (High Speed Downlink Packet Access, high speed downlink packet access), the throughput drops by 10%; while for a 64 QAM modulated HADPA+, the throughput drops by 45%. To solve the problem, an embodiment of the present invention provides a bandwidth configuration method, and a processing procedure of the bandwidth configuration method is as shown in FIG. 3, where a specific implementation mode is as follows:

S301: A terminal acquires that a narrow bandwidth mode is used at a network side by a downlink transmission signal and/or an uplink transmission signal.

The narrow bandwidth mode used by the network side is as described above.

S302: The terminal configures a receiving bandwidth and/or a transmitting bandwidth, where the receiving bandwidth and/or the transmitting bandwidth corresponds to the narrow bandwidth mode at the network side.

If the narrow bandwidth mode is used by the downlink transmission signal at the network side, the terminal configures the receiving bandwidth; if the narrow bandwidth mode is used by the uplink transmission signal at the network side, the terminal configures the transmitting bandwidth; and if the downlink transmission signal at the network side and the uplink transmission signal at the network side both use the narrow bandwidth mode, the terminal respectively performs corresponding configuration on the receiving bandwidth and the transmitting bandwidth. The configuring the receiving bandwidth refers to: configuring a downlink passband bandwidth and/or a transition band suppression characteristic; and the configuring the transmitting bandwidth refers to: configuring an uplink passband bandwidth and/or a transition band suppression characteristic.

In the embodiment of the present invention, the terminal side can acquire whether the narrow bandwidth technology is used at the network side, and automatically adjust the corresponding receiving bandwidth and/or transmitting bandwidth at the terminal side when the narrow bandwidth technology is used at the network side, so that intra-system performance loss and inter-system interference that are caused by different bandwidth modes between the terminal side and the network side are avoided, thus improving performance of a communication system.

As an example instead of a limitation, the method provided in the embodiment of the present invention may be applied in network coordinative deployment between WCDMA and a GSM, and may also be applied in network coordinative deployment between WCDMA and TD-SCDMA, WCDMA and LTE, and WCDMA and WIMAX; and may also employ the narrow bandwidth technology to compress the bandwidth of the WCDMA, so that an interval between two WCDMA frequency points is smaller than 5 MHz.

In the method provided by the embodiment of the present invention, the terminal may specifically acquire that the network side uses the narrow bandwidth mode by receiving a narrow bandwidth parameter sent by the network side, where the narrow bandwidth parameter includes: a passband bandwidth parameter of the narrow bandwidth mode used by the downlink transmission signal at the network side and/or a transition band suppression characteristic parameter of the narrow bandwidth mode used by the downlink transmission signal at the network side, and/or a passband bandwidth parameter of the narrow bandwidth mode used by the uplink transmission signal at the network side and/or a transition band suppression characteristic parameter of the narrow bandwidth mode used by the uplink transmission signal at the network side. The implementation mode of the foregoing S302 may be: according to the narrow bandwidth parameter, configuring, by the terminal, a receiving bandwidth and/or a transmitting bandwidth, where the receiving bandwidth and/or the transmitting bandwidth corresponds to the narrow bandwidth mode at the network side. The specific implementation mode may be: according to the received passband bandwidth parameter of the narrow bandwidth mode used by the downlink transmission signal and/or transition band suppression characteristic parameter of the narrow bandwidth mode used by the downlink transmission signal, configuring a passband bandwidth parameter of a filter of a receiver and/or a transition band suppression characteristic of the filter of the receiver, so that the receiving bandwidth of the terminal is the same as the bandwidth of the downlink transmission signal at the network side; and according to the received passband bandwidth parameter of the narrow bandwidth mode used by the uplink transmission signal and/or transition band suppression characteristic parameter of the narrow bandwidth mode used by the uplink transmission signal, configuring a passband bandwidth parameter of a filter in a transmitter and/or a transition band suppression characteristic of the filter in the transmitter, so that the transmitting bandwidth of the terminal is the same as the bandwidth of the uplink transmission signal at the network side.

Correspondingly, an embodiment of the present invention further provides a method for configuring a bandwidth of a terminal with the assistance of a network-side device. The method includes: sending, by the network-side device, a narrow bandwidth parameter corresponding to a currently-used narrow bandwidth mode to the terminal. The specific implementation mode may be: sending, by the network-side device, through a downlink channel, a narrow bandwidth parameter of a downlink transmission signal and/or a narrow bandwidth parameter of an uplink transmission signal currently configured at a network side to the terminal. The narrow bandwidth parameter of the downlink transmission signal and/or the narrow bandwidth parameter of the uplink transmission signal is sent as a separate message, or may be carried in an existing communication message sent by the network-side device. Further, the message carrying the foregoing narrow bandwidth parameter also carries bandwidth configuration identification information. The terminal identifies, according to the bandwidth configuration identification information, that the bandwidth parameter of the downlink transmission signal at the network side and/or the bandwidth parameter of the uplink transmission signal at the network side is received, and further performs bandwidth configuration according to the bandwidth parameter. As an example instead of a limitation, the bandwidth configuration identification information may be used to identify that the corresponding message carries the bandwidth parameter, and the terminal acquires, after obtaining and parsing the corresponding bandwidth parameter, whether the narrow bandwidth mode is used at the network side; and the bandwidth configuration identification information may also be used to identify the specific bandwidth mode corresponding to the corresponding message, and the terminal directly acquires, according to the bandwidth configuration identification information, whether the narrow bandwidth mode is used at the network side.

In the method provided by the embodiment of the present invention, the terminal may also acquire that the narrow bandwidth mode is used by the downlink transmission signal at the network side in the following manner: The terminal obtains passband average power of the downlink transmission signal and transition band average power of the downlink transmission signal in predetermined time; and if a ratio between the passband average power of the downlink transmission signal and the transition band average power of the downlink transmission signal is smaller than a predetermined threshold, acquires that the narrow bandwidth mode is used by the downlink transmission signal at the network side. Correspondingly, the implementation mode that the terminal configures the receiving bandwidth corresponding to the narrow bandwidth mode at the network side may be: configuring, by the terminal, the receiving bandwidth to be a predetermined value. The foregoing predetermined time, the predetermined threshold, and the predetermined value of the receiving bandwidth may be set by a user or a terminal provider according to a network environment or through negotiation with an operator. In addition, the implementation mode that the terminal configures the receiving bandwidth corresponding to the narrow bandwidth mode at the network side may also be: receiving, by the terminal, data by using each pre-configured narrow bandwidth mode respectively, where the each bandwidth mode is corresponding to each of multiple bandwidth modes of the downlink transmission signal, where the multiple narrow bandwidth modes of the downlink transmission signal are preset by the network side; comparing receiving performance of the each narrow bandwidth mode; and selecting a narrow bandwidth mode with the optimal receiving performance (the narrow bandwidth mode at the terminal side corresponding to the narrow bandwidth mode currently used by the network side has the optimal receiving performance), and configuring, according to the selected narrow bandwidth mode, the receiving bandwidth. As an example instead of a limitation, the receiving performance may be evaluated by estimating a downlink-channel receiving signal-to-noise ratio, or the receiving performance may be evaluated by a downlink BLER (Block Error Ratio, block error ratio) obtained through a CRC (Cyclic Redundancy Check, cyclic redundancy check).

Figure 4:
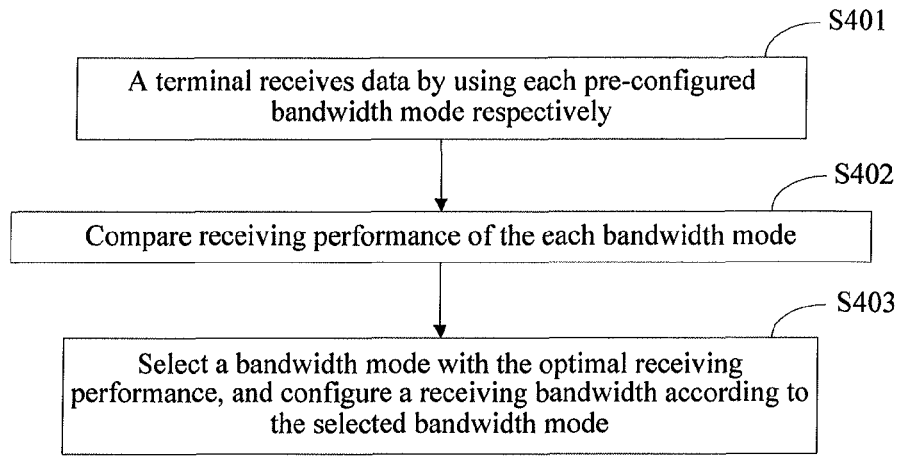
FIG. 4 is a flow chart of another method according to an embodiment of the present invention.

To solve the foregoing technical problems, an embodiment of the present invention further provides a bandwidth configuration method, and an implementation mode of the bandwidth configuration method is as shown in FIG. 4, and includes:

S401: A terminal receives data by using each pre-configured bandwidth mode respectively, where the each bandwidth mode is corresponding to each of multiple bandwidth modes of a downlink transmission signal respectively, where the multiple bandwidth modes of the downlink transmission signal is preset by a network side.

S402: Compare receiving performance of the each bandwidth mode.

S403: Select a bandwidth mode with the optimal receiving performance, and configure, according to the selected bandwidth mode, a receiving bandwidth.

In the foregoing implementation mode, a terminal user or a terminal provider pre-acquires multiple bandwidth modes configured by the network side, where the multiple bandwidth modes include: bandwidth modes configured according to an existing communication standard, and at least one narrow bandwidth mode; each bandwidth mode has different downlink passband bandwidths and/or transition band suppression characteristics. Moreover, the terminal user or the terminal provider pre-configures, in the terminal, bandwidth modes corresponding to the multiple bandwidth modes at the network side.

Through this method, the terminal can obtain the optimal receiving performance in real time. When the narrow bandwidth technology is used at the network side, the terminal side can detect that the corresponding narrow bandwidth mode has the optimal receiving performance, so as to adjust to the corresponding narrow bandwidth mode. Therefore, intra-system performance loss and inter-system interference that are caused by different bandwidth modes at the terminal side and the network side are avoided, thus improving performance of a communication system.

Specific implementation modes of the embodiments of the present invention in actual applications are illustrated in detail below.

Embodiment 1

Figure 1:
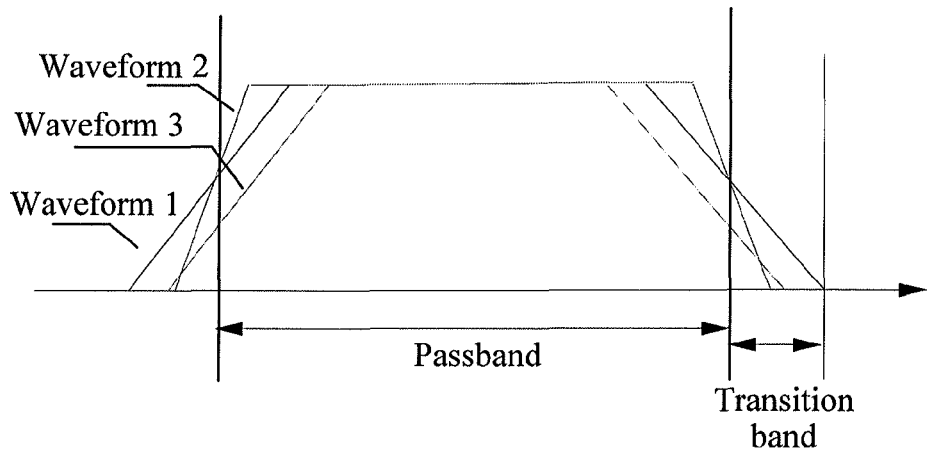
FIG. 1 is a schematic diagram of waveforms of a filter in the prior art.
Figure 5:
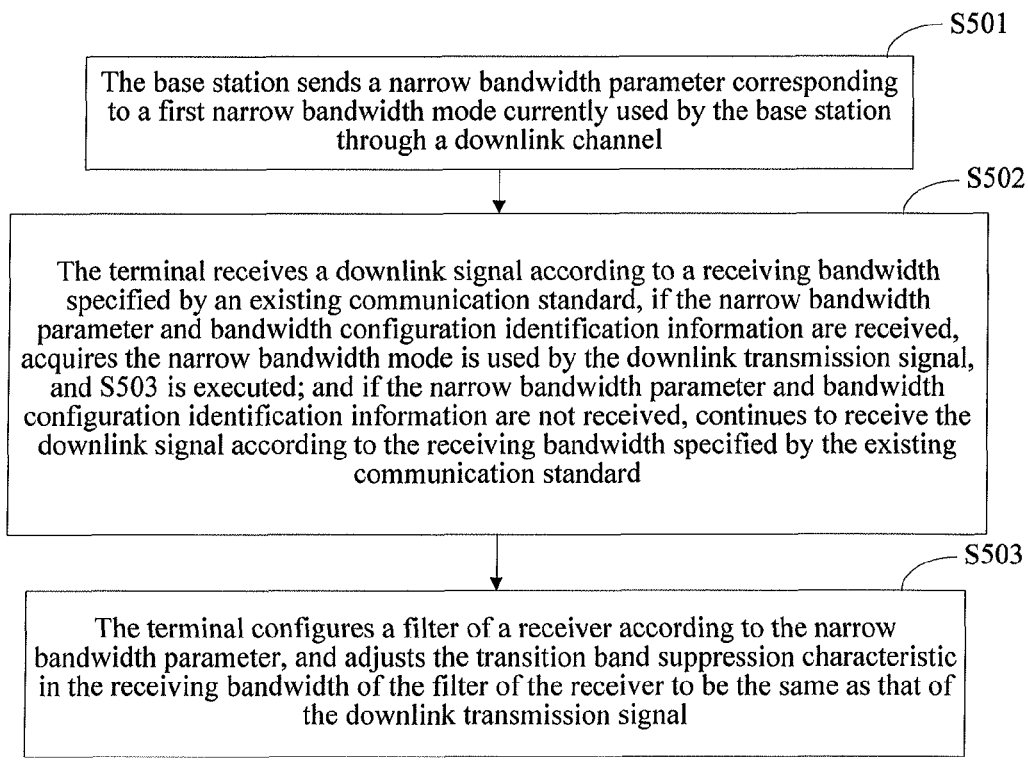
FIG. 5 is a flow chart of a method according to a first embodiment of the present invention.

In a first embodiment of the present invention, coordinative deployment is performed between WCDMA and a GSM, a base station at a WCDMA network side uses a narrow bandwidth technology, and filtering waveforms of a filter of the base station are as shown in FIG. 1. The base station altogether configures three bandwidth modes, which respectively are a bandwidth mode which is specified by an existing communication standard and corresponds to a waveform 1, a first narrow bandwidth mode corresponding to a waveform 2, and a second narrow bandwidth mode corresponding to a waveform 3. A downlink transmission signal of the base station currently uses the first narrow bandwidth mode for data transmission. The processing procedure in the first embodiment of the present invention is as shown in FIG. 5, and specifically includes the following operations:

S501: The base station sends, on a downlink channel, a narrow bandwidth parameter corresponding to the first narrow bandwidth mode currently used by the base station (the narrow bandwidth parameter may only include a transition band suppression characteristic parameter in the first narrow bandwidth mode, and may also include a transition band suppression characteristic parameter and a passband bandwidth), and also carries bandwidth configuration identification information in a message that sends the narrow bandwidth parameter at the same time. Specifically, the narrow bandwidth parameter and the bandwidth configuration identification information may be sent periodically on a broadcast channel, and the narrow bandwidth parameter and the bandwidth configuration information may also be sent through physical layer signaling after the terminal is paged and found.

After the terminal starts, or when the terminal is handed over to a cell frequency point of the base station, S502 is executed. The terminal receives a downlink signal according to a receiving bandwidth specified by the existing communication standard, if the narrow bandwidth parameter and the bandwidth configuration identification information are received, acquires that the narrow bandwidth mode is used by the downlink transmission signal, and S503 is executed; and if the narrow bandwidth parameter and the bandwidth configuration identification information are not received, continues to receive the downlink signal according to the receiving bandwidth specified by the existing communication standard.

S503: The terminal configures a filter of a receiver according to the narrow bandwidth parameter (as an example instead of a limitation, it may be a receiving shaping filter), and adjusts a transition band suppression characteristic in a receiving bandwidth of the filter of the receiver to be the same as that of the downlink transmission signal.

Through the foregoing processing procedure, the terminal supports a downlink narrow bandwidth corresponding to the base station, thus improving the receiving performance of the terminal.

If the narrow bandwidth mode is used by the uplink transmission signal of the base station, the base station sends the narrow bandwidth parameter corresponding to the narrow bandwidth mode used by the uplink transmission signal to the terminal (reference may be made to the foregoing processing procedure for the specific sending manner). Reference may be made to the foregoing processing procedure for the processing procedure that the terminal configures the corresponding narrow bandwidth mode, which is not repeatedly described here. The terminal, after configuring the transmitting bandwidth, supports the uplink narrow bandwidth corresponding to the base station, thus improving the uplink performance and reducing interference in a GSM network.

Further, in the foregoing processing procedure, an example is taken for illustration, where S502 is performed after the terminal starts or when the terminal is handed over to the cell frequency point of the base station. It should be noted that, in actual applications, the terminal is not limited to receiving the narrow bandwidth parameter and the bandwidth configuration identification information in the foregoing situation. As an example instead of a limitation, S502 may also be executed periodically after the terminal is handed over to the cell frequency point of the base station.

In the first embodiment of the present invention, if the bandwidth mode is switched at a base station side, for example, switched to the bandwidth mode specified by the existing communication standard, or switched to the second narrow bandwidth mode, the bandwidth parameter corresponding to the switched bandwidth mode is still sent to the terminal through the downlink transmission signal, so that the terminal is enabled to perform adaptive adjustment and configuration on the receiving bandwidth or transmitting bandwidth.

Embodiment 2

Figure 6:
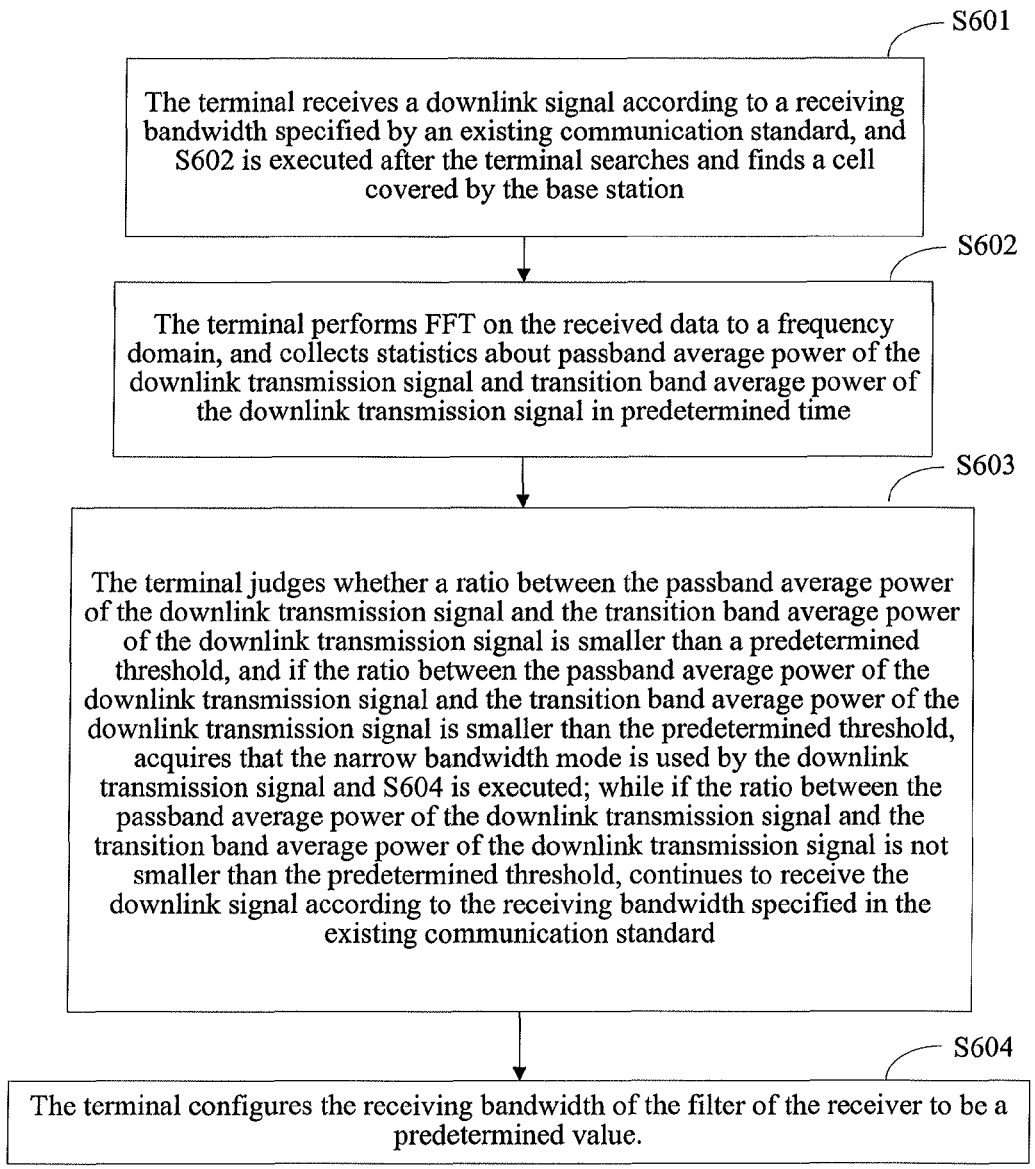
FIG. 6 is a flow chart of a method according to a second embodiment of the present invention.

In a second embodiment of the present invention, coordinative deployment is performed between WCDMA and a GSM, a base station at a WCDMA network side uses a narrow bandwidth technology, and filtering waveforms of a filter of the base station are as shown in FIG. 1. The base station altogether configures three bandwidth modes, respectively a bandwidth mode which is specified by an existing communication standard and corresponds to a waveform 1, a first narrow bandwidth mode corresponding to a waveform 2, and a second narrow bandwidth mode corresponding to a waveform 3. A downlink transmission signal of the base station currently uses the first narrow bandwidth mode for data transmission. The processing procedure in the second embodiment of the present invention is as shown in FIG. 6, and specifically includes the following operations:

After a terminal starts, or when the terminal is handed over to a cell frequency point of the base station, S601 is executed. The terminal receives a downlink signal according to a receiving bandwidth specified by the existing communication standard, and S602 is executed after the terminal searches and finds a cell covered by the base station.

S602: The terminal performs FFT (fast Fourier transform) on the received data to a frequency domain, collects statistics about passband average power of the downlink transmission signal and transition band average power of the downlink transmission signal in predetermined time, and S603 is executed.

S603: The terminal judges whether a ratio between the passband average power of the downlink transmission signal and the transition band average power of the downlink transmission signal is smaller than a predetermined threshold, and if the ratio between the passband average power of the downlink transmission signal and the transition band average power of the downlink transmission signal is smaller than the predetermined threshold, acquires that the narrow bandwidth mode is used by the downlink transmission signal and S604 is executed; while if the ratio between the passband average power of the downlink transmission signal and the transition band average power of the downlink transmission signal is not smaller than the predetermined threshold, continues to receive the downlink signal according to the receiving bandwidth specified in the existing communication standard.

S604: The terminal configures the receiving bandwidth of the filter of the receiver to be a predetermined value.

When the terminal fails to obtain bandwidth configuration information of the base station side through a downlink channel, or does not obtain the bandwidth configuration information of the base station side through the downlink channel, through the foregoing processing procedure, after it is acquired that the narrow bandwidth mode is used by the downlink transmission signal, the receiving bandwidth can be adjusted in time, thus improving as much as possible receiving performance of the terminal.

Embodiment 3

Figure 7:
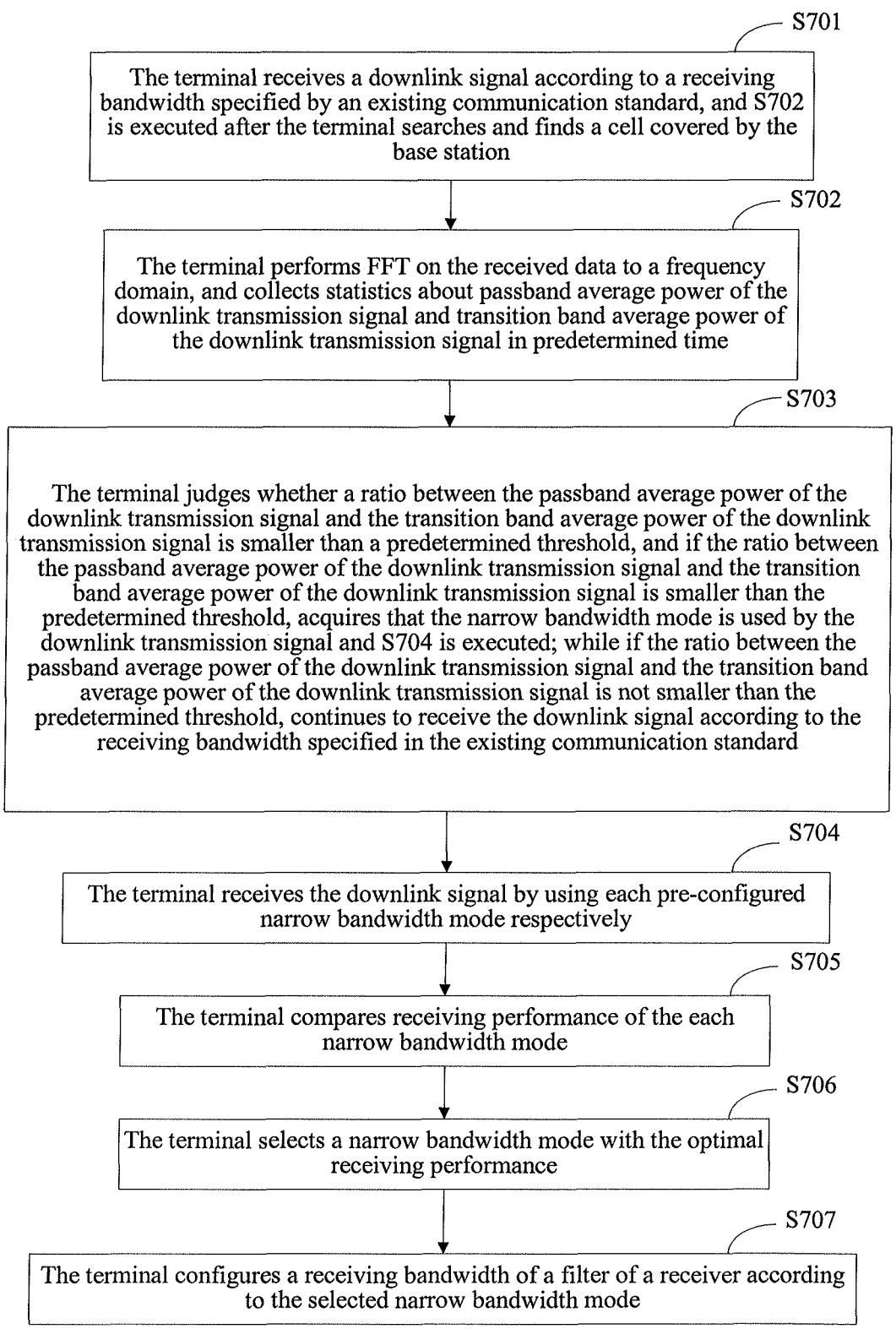
FIG. 7 is a flow chart of a method according to a third embodiment of the present invention.

In a third embodiment of the present invention, coordinative deployment is performed between WCDMA and a GSM, a base station at a WCDMA network side uses a narrow bandwidth technology, and filtering waveforms of a filter of the base station are as shown in FIG. 1. The base station altogether configures three bandwidth modes, respectively a bandwidth mode which is specified by an existing communication standard and corresponds to a waveform 1, a first narrow bandwidth mode corresponding to a waveform 2, and a second narrow bandwidth mode corresponding to a waveform 3. A downlink transmission signal of the base station currently uses the first narrow bandwidth mode for data transmission. The processing procedure in the third embodiment of the present invention is as shown in FIG. 7, and specifically includes the following operations:

After a terminal starts, or when the terminal is handed over to a cell frequency point of the base station, S701 is executed. The terminal receives a downlink signal according to a receiving bandwidth specified by the existing communication standard, and S702 is executed after the terminal searches and finds a cell covered by the base station.

S702: The terminal performs FFT on the received data to a frequency domain, collects statistics about passband average power of the downlink transmission signal and transition band average power of the downlink transmission signal in predetermined time, and S703 is executed.

S703: The terminal judges whether a ratio between the passband average power of the downlink transmission signal and the transition band average power of the downlink transmission signal is smaller than a predetermined threshold, and if the ratio between the passband average power of the downlink transmission signal and the transition band average power of the downlink transmission signal is smaller than the predetermined threshold, acquires that the narrow bandwidth mode is used by the downlink transmission signal and S704 is executed; while if the ratio between the passband average power of the downlink transmission signal and the transition band average power of the downlink transmission signal is not smaller than the predetermined threshold, continues to receive the downlink signal according to the receiving bandwidth specified in the existing communication standard.

S704: The terminal receives the downlink signal by using each pre-configured narrow bandwidth mode respectively, and S705 is executed.

A terminal user or a terminal provider pre-acquires multiple narrow bandwidth modes which are configured by a network side and as shown in FIG. 1. Moreover, the terminal user or the terminal provider pre-configures narrow bandwidth modes in the terminal, where the narrow bandwidth modes in the terminal correspond to the multiple narrow bandwidth modes at the network side.

S705: The terminal compares receiving performance of the each narrow bandwidth mode, and S706 is executed.

The specific implementation mode of S705 may be, but not limited to: obtaining and saving, by the terminal, the receiving performance of the each narrow bandwidth mode, and comparing the saved receiving performance of the each narrow bandwidth mode.

S706: The terminal selects a narrow bandwidth mode with the optimal receiving performance. In the third embodiment of the present invention, because the first narrow bandwidth mode is used by the downlink transmission signal at the base station side, the narrow bandwidth mode with the optimal receiving performance, where the narrow bandwidth mode with the optimal receiving performance is selected by the terminal, is a narrow bandwidth mode corresponding to the first narrow bandwidth mode.

S707: The terminal configures a receiving bandwidth of a filter of a receiver according to the selected narrow bandwidth mode.

When the terminal fails to obtain bandwidth configuration information of the base station side through a downlink channel, or does not obtain the bandwidth configuration information of the base station side through the downlink channel, through the foregoing processing procedure, after it is acquired that the narrow bandwidth mode is used by the downlink transmission signal, the receiving bandwidth can be adjusted in time, thus improving as much as possible receiving performance of the terminal.

Embodiment 4

Figure 8:
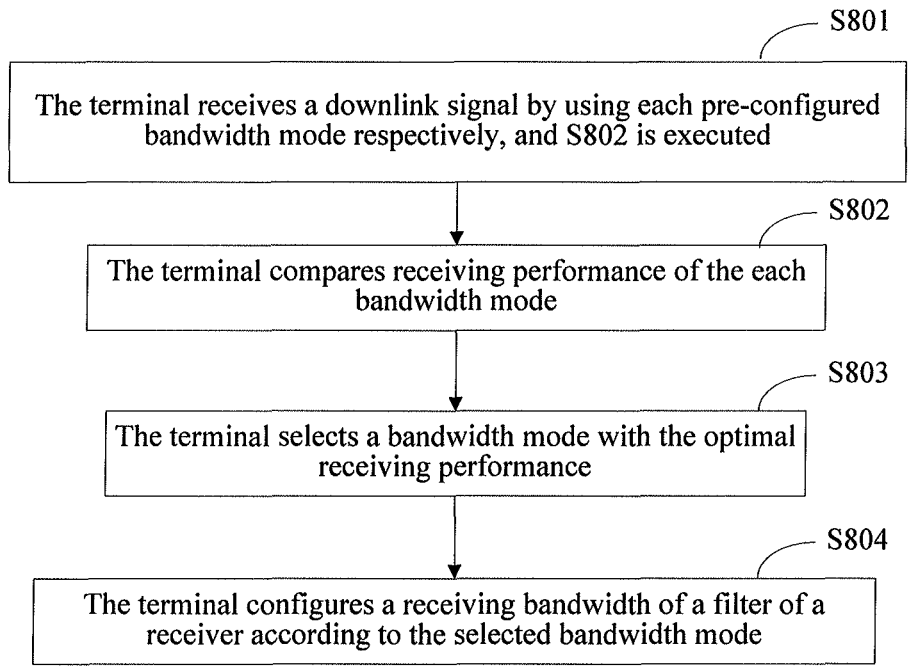
FIG. 8 is a flow chart of a method according to a fourth embodiment of the present invention.

In a fourth embodiment of the present invention, coordinative deployment is performed between WCDMA and a GSM, a base station at a WCDMA network side uses a narrow bandwidth technology, and filtering waveforms of a filter of the base station are as shown in FIG. 1. The base station altogether configures three bandwidth modes, respectively a bandwidth mode which is specified by an existing communication standard and corresponds to a waveform 1, a first narrow bandwidth mode corresponding to a waveform 2, and a second narrow bandwidth mode corresponding to a waveform 3. A downlink transmission signal of the base station currently uses the first narrow bandwidth mode for data transmission. The processing procedure in the fourth embodiment of the present invention is as shown in FIG. 8, and specifically includes the following operations:

After a terminal starts, or when the terminal is handed over to a cell frequency point of the base station, S801 is executed. The terminal receives a downlink signal by using each pre-configured bandwidth mode respectively, and S802 is executed.

A terminal user or a terminal provider pre-acquires multiple bandwidth modes which are configured by a network side and as shown in FIG. 1. Moreover, the terminal user or the terminal provider pre-configures bandwidth modes in the terminal, where the bandwidth modes in the terminal correspond to the multiple bandwidth modes of the network side. As an example instead of a limitation, the terminal user may acquire a bandwidth configuration condition of the network side by consulting a network operator through a network or a phone call.

S802: The terminal compares receiving performance of the each bandwidth mode, and S803 is executed.

S803: The terminal selects a bandwidth mode with the optimal receiving performance, and in the fourth embodiment of the present invention, because the first narrow bandwidth mode is used by the downlink transmission signal of the base station side, the bandwidth mode with the optimal receiving performance, where the bandwidth mode with the optimal receiving performance is selected by the terminal, is a bandwidth mode corresponding to the first narrow bandwidth mode.

S804: The terminal configures a receiving bandwidth of a filter of a receiver according to the selected bandwidth mode.

Through the method provided by the fourth embodiment of the present invention, the terminal may obtain the optimal receiving performance in real time. When the narrow bandwidth technology is used by the network side, the terminal side may detect that a corresponding narrow bandwidth mode has the optimal receiving performance, so as to adjust to the corresponding narrow bandwidth mode. Therefore, intra-system performance loss and inter-system interference that are caused by different bandwidth modes between the terminal side and the network side are avoided, thus improving performance of a communication system.

All or part of the steps of the foregoing method embodiments may be implemented by a program instructing relevant hardware. The program may be stored in a computer readable storage medium. When the program is executed, the steps of the foregoing method embodiments are performed. The storage medium may be any medium that may store program codes, such as a ROM, a RAM, a magnetic disk, or an optical disk.

Figure 9:
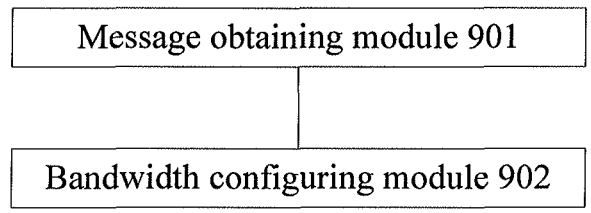
FIG. 9 is a schematic structural diagram of a terminal according to an embodiment of the present invention.

An embodiment of the present invention further provides a bandwidth configuration terminal, and the structure of the bandwidth configuration terminal is as shown in FIG. 9, where the specific implementation structure includes:

a message obtaining module 901, configured to acquire that a narrow bandwidth mode is used at a network side by a downlink transmission signal and/or an uplink transmission signal, where the narrow bandwidth mode used by the network side is as described above; and a bandwidth configuring module 902, configured to configure a receiving bandwidth and/or a transmitting bandwidth, where the receiving bandwidth and/or the transmitting bandwidth corresponds to the narrow bandwidth mode at the network side. If the narrow bandwidth mode is used by the downlink transmission signal at the network side, the terminal configures the receiving bandwidth; if the narrow bandwidth mode is used by the uplink transmission signal at the network side, the terminal configures the transmitting bandwidth; and if the downlink transmission signal at the network side and the uplink transmission signal at the network side both use the narrow bandwidth mode, the terminal respectively performs corresponding configuration on the receiving bandwidth and the transmitting bandwidth. The configuring the receiving bandwidth refers to: configuring a downlink passband bandwidth and/or a transition band suppression characteristic; and the configuring the transmitting bandwidth refers to: configuring an uplink passband bandwidth and/or a transition band suppression characteristic.

The terminal provided by the embodiment of the present invention can acquire whether the network side uses the narrow bandwidth technology, and automatically adjust a bandwidth of a corresponding channel at the terminal side when the narrow bandwidth technology is used by the network side, so that intra-system performance loss and inter-system interference that are caused by different bandwidth modes between the terminal side and the network side are avoided, thus improving performance of the communication system.

In the terminal provided by the embodiment of the present invention, the message obtaining module 901 is specifically configured to receive a narrow bandwidth parameter sent by the network side, where the narrow bandwidth parameter includes: a passband bandwidth parameter of the narrow bandwidth mode used by the downlink transmission signal at the network side and/or a transition band suppression characteristic parameter of the narrow bandwidth mode used by the downlink transmission signal at the network side, and/or a passband bandwidth parameter of the narrow bandwidth mode used by the uplink transmission signal at the network side and/or a transition band suppression characteristic parameter of the narrow bandwidth mode used by the uplink transmission signal at the network side. Correspondingly, the bandwidth configuring module 902 is specifically configured to configure, according to the narrow bandwidth parameter obtained by the message obtaining module, the receiving bandwidth and/or the transmitting bandwidth, where the receiving bandwidth and/or the transmitting bandwidth corresponds to the narrow bandwidth mode at the network side. The specific implementation mode may be: according to the received passband bandwidth parameter of the narrow bandwidth mode used by the downlink transmission signal and/or transition band suppression characteristic parameter of the narrow bandwidth mode used by the downlink transmission signal, configuring a passband bandwidth parameter of a receiving filter and/or a transition band suppression characteristic of a receiving filter, so that the receiving bandwidth is the same as the bandwidth of the downlink transmission signal at the network side; and according to the received passband bandwidth parameter of the narrow bandwidth mode used by the uplink transmission signal and/or transition band suppression characteristic parameter of the narrow bandwidth mode used by the uplink transmission signal, configuring a passband bandwidth parameter of a transmitting filter and/or a transition band suppression characteristic of a transmitting filter, so that the transmitting bandwidth is the same as the bandwidth of the uplink transmission signal at the network side.

In the terminal provided by the embodiment of the present invention, another specific working mode of the message obtaining module 901 is that: obtaining passband average power of the downlink transmission signal and transition band average power of the downlink transmission signal in predetermined time; and if a ratio between the passband average power of the downlink transmission signal and the transition band average power of the downlink transmission signal is smaller than a predetermined threshold, acquiring that the narrow bandwidth mode is used by the downlink transmission signal at the network side. Correspondingly, the bandwidth configuring module 902 is specifically configured to configure the receiving bandwidth to be a predetermined value. The predetermined time, the predetermined threshold, and the predetermined value of the receiving bandwidth may be set by a user or a terminal provider according to a network environment or through negotiation with an operator. In another implementation mode, the bandwidth configuring module 902 may specifically include: a detecting sub-module 9021, configured to receive data by using each pre-configured narrow bandwidth mode respectively, where the each narrow bandwidth mode is corresponding to each of multiple narrow bandwidth modes of the downlink transmission signal respectively, where the multiple narrow bandwidth modes of the downlink transmission signal are preset by the network side; compare receiving performance of the each bandwidth mode; and select a bandwidth mode with the optimal receiving performance; a configuring sub-module 9022, configured to configure the receiving bandwidth according to the selected bandwidth mode.

Figure 10:
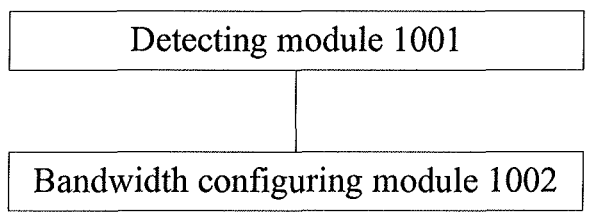
FIG. 10 is a schematic structural diagram of another terminal according to an embodiment of the present invention.

An embodiment of the present invention further provides another bandwidth configuration terminal, and the structure of the bandwidth configuration terminal is as shown in FIG. 10, where the specific implementation structure includes:

a detecting module 1001, configured to receive data by using each pre-configured bandwidth mode respectively, where the each bandwidth mode is corresponding to each of multiple bandwidth modes of a downlink transmission signal respectively, where the multiple bandwidth modes of the downlink transmission signal are preset by a network side; and compare receiving performance of the each bandwidth mode; and a bandwidth configuring module 1002, configured to select a bandwidth mode with the optimal receiving performance, and configure, according to the selected bandwidth mode, a receiving bandwidth.

A terminal user or a terminal provider pre-acquires multiple bandwidth modes configured by the network side, where the multiple bandwidth modes include: bandwidth modes configured according to an existing communication standard, and at least one narrow bandwidth mode; each bandwidth mode has different downlink passband bandwidths and/or transition band suppression characteristics. Moreover, the terminal user or the terminal provider pre-configures bandwidth modes in the terminal, where the bandwidth modes in the terminal correspond to the multiple bandwidth modes at the network side.

The terminal may obtain the optimal receiving performance in real time. When the network side uses the narrow bandwidth technology, the terminal side can detect that a corresponding narrow bandwidth mode has the optimal receiving performance, so as to adjust to the corresponding narrow bandwidth mode. Therefore, intra-system performance loss and inter-system interference that are caused by different bandwidth modes between the terminal side and the network side are avoided, thus improving performance of the communication system.

An embodiment of the present invention further provides a bandwidth configuration system, which includes a network-side device and a terminal. The network-side device is configured to send a narrow bandwidth parameter corresponding to a currently-used narrow bandwidth mode to a terminal, to notify the terminal that a narrow bandwidth mode is used at a network side. The terminal is configured to receive the narrow bandwidth parameter sent by the network-side device, and configure, according to the narrow bandwidth parameter, a receiving bandwidth and/or a transmitting bandwidth, where the receiving bandwidth and/or the transmitting bandwidth corresponds to the narrow bandwidth mode at the network side. The narrow bandwidth parameter includes: a passband bandwidth parameter of a narrow bandwidth mode used by a downlink transmission signal at the network side and/or a transition band suppression characteristic parameter of the narrow bandwidth mode used by the downlink transmission signal at the network side, and/or a passband bandwidth parameter of a narrow bandwidth mode used by an uplink transmission signal at the network side and/or a transition band suppression characteristic parameter of the narrow bandwidth mode used by the uplink transmission signal at the network side.

The network side notifies the terminal side of the currently-used bandwidth mode, so that the terminal side can acquire whether the network side uses the narrow bandwidth technology, and automatically adjust the corresponding receiving bandwidth and/or transmitting bandwidth at the terminal side when the network side uses the narrow bandwidth technology. Therefore, intra-system performance loss and inter-system interference that are caused by different bandwidth modes between the terminal side and the network side are avoided, thus improving performance of a communication system.

The foregoing description is merely exemplary embodiments of the present invention, and is not intended to limit the protection scope of the present invention. Various modifications and replacements that can be easily thought of by persons skilled in the art without departing from the technical scope of the present invention should fall within the protection scope of the present invention. Therefore, the protection scope of the present invention should be subject to the appended claims.

What is claimed is:

1. A bandwidth configuration method, comprising:
acquiring, by a terminal, that a narrow bandwidth mode is used at a network side by a downlink transmission signal and/or an uplink transmission signal; and
configuring, by the terminal, a receiving bandwidth and/or a transmitting bandwidth, wherein the receiving bandwidth and/or the transmitting bandwidth corresponds to the narrow bandwidth mode at the network side such that the receiving bandwidth and/or the transmitting bandwidth can be adjusted at the terminal side when the narrow band width is used at the network side;

wherein acquiring, by the terminal, that the narrow bandwidth mode is used at the network side by the downlink transmission signal comprises:
obtaining, by the terminal, passband average power of the downlink transmission signal and transition band average power of the downlink transmission signal in predetermined time; and
if a ratio between the passband average power of the downlink transmission signal and the transition band average power of the downlink transmission signal is smaller than a predetermined threshold, acquiring that the narrow bandwidth mode is used at the network side by the downlink transmission signal.

2. The method according to claim 1, wherein the acquiring, by the terminal, that the narrow bandwidth mode is used at the network side by the downlink transmission signal and/or the uplink transmission signal comprises:
receiving, by the terminal, a narrow bandwidth parameter sent by the network side, wherein the narrow bandwidth parameter comprises: a passband bandwidth parameter of the narrow bandwidth mode used by the downlink transmission signal at the network side and/or a transition band suppression characteristic parameter of the narrow bandwidth mode used by the downlink transmission signal at the network side, and/or a passband bandwidth parameter of the narrow bandwidth mode used by the uplink transmission signal at the network side and/or a transition band suppression characteristic parameter of the narrow bandwidth mode used by the uplink transmission signal at the network side; and
the configuring, by the terminal, the receiving bandwidth and/or the transmitting bandwidth, wherein the receiving bandwidth and/or the transmitting bandwidth corresponds to the narrow bandwidth mode at the network side comprises: configuring, by the terminal and according to the narrow bandwidth parameter, the receiving bandwidth and/or the transmitting bandwidth, wherein the receiving bandwidth and/or the transmitting bandwidth corresponds to the narrow bandwidth mode at the network side.

3. The method according to claim 2, wherein if the bandwidth mode of the downlink transmission signal and/or the uplink transmission signal is switched at the network side, the method further comprises:
receiving, by the terminal, a bandwidth parameter of the switched downlink transmission signal at the network side and/or uplink transmission signal at the network side, and configuring the receiving bandwidth and/or the transmitting bandwidth according to the bandwidth parameter.

4. The method according to claim 1, wherein the configuring, by the terminal, the receiving bandwidth corresponding to the narrow bandwidth mode at the network side comprises:
configuring, by the terminal, the receiving bandwidth to be a predetermined value.

5. The method according to claim 1, wherein the configuring, by the terminal, the receiving bandwidth corresponding to the narrow bandwidth mode at the network side comprises:
receiving, by the terminal, data by using each pre-configured narrow bandwidth mode respectively, wherein the each narrow bandwidth mode is corresponding to each of multiple narrow bandwidth modes of the downlink transmission signal, wherein the multiple narrow bandwidth modes of the downlink transmission signal are preset by the network side;
comparing receiving performance of the each narrow bandwidth mode; and
selecting a narrow bandwidth mode with the optimal receiving performance, and configuring the receiving bandwidth according to the selected narrow bandwidth mode.

6. A bandwidth configuration method, comprising:
sending, by a network-side device, a narrow bandwidth parameter corresponding to a currently-used narrow bandwidth mode to a terminal, to notify the terminal that a narrow bandwidth mode is used at a network side;
acquiring, by the terminal, that the narrow bandwidth mode is used at the network side by a downlink transmission signal comprises:
obtaining, by the terminal, passband average power of the downlink transmission signal and transition band average power of the downlink transmission signal in predetermined time; and
if a ratio between the passband average power of the downlink transmission signal and the transition band average power of the downlink transmission signal is smaller than a predetermined threshold, acquiring that the narrow bandwidth mode is used at the network side by the downlink transmission signal.

7. The method according to claim 6, wherein if a bandwidth mode of the downlink transmission signal and/or an uplink transmission signal is switched at the network side, the method further comprises: sending, by the network-side device, a bandwidth parameter of the switched downlink transmission signal and/or uplink transmission signal to the terminal.

8. A bandwidth configuration terminal, comprising:
a message obtaining module, configured to acquire that a narrow bandwidth mode is used at a network side by a downlink transmission signal and/or an uplink transmission signal; and
a bandwidth configuring module, configured to configure a receiving bandwidth and/or a transmitting bandwidth, wherein the receiving bandwidth and/or the transmitting bandwidth corresponds to the narrow bandwidth mode at the network side such that the receiving bandwidth and/or the transmitting bandwidth can be adjusted at the terminal side when the narrow band width is used at the network side;
wherein the message obtaining module is specifically configured to obtain passband average power of the downlink transmission signal and transition band average power of the downlink transmission signal in predetermined time; and if a ratio between the passband average power of the downlink transmission signal and the transition band average power of the downlink transmission signal is smaller than a predetermined threshold, the message obtaining module is configured to acquire that the narrow bandwidth mode is used by the downlink transmission signal at the network side.

9. The terminal according to claim 8, wherein the message obtaining module is specifically configured to receive a narrow bandwidth parameter sent by the network side, wherein the narrow bandwidth parameter comprises: a passband bandwidth parameter of the narrow bandwidth mode used by the downlink transmission signal at the network side and/or a transition band suppression characteristic parameter of the narrow bandwidth mode used by the downlink transmission signal at the network side, or a passband bandwidth parameter of the narrow bandwidth mode used by the uplink transmission signal at the network side and/or a transition band suppression characteristic parameter of the narrow bandwidth mode used by the uplink transmission signal at the network side; and the bandwidth configuring module is specifically configured to configure, according to the narrow bandwidth parameter obtained by the message obtaining module, the receiving bandwidth and/or the transmitting bandwidth, wherein the receiving bandwidth and/or the transmitting bandwidth corresponds to the narrow bandwidth mode at the network side.

10. The terminal according to claim 8, wherein the bandwidth configuring module is specifically configured to configure the receiving bandwidth to be a predetermined value.

11. The terminal according to claim 8, wherein the bandwidth configuring module comprises:
- a detecting sub-module, configured to receive data by using each pre-configured narrow bandwidth mode respectively, wherein the each narrow bandwidth mode is corresponding to each of multiple narrow bandwidth modes of the downlink transmission signal respectively, wherein the multiple narrow bandwidth modes of the downlink transmission signal are preset by the network side; and compare receiving performance of the each bandwidth mode; and
- a configuring sub-module, configured to select a bandwidth mode with the optimal receiving performance, and configure, according to the selected bandwidth mode, the receiving bandwidth.

\* \* \* \* \*